Oct. 26, 1937.     W. A. CLARK     2,096,786
SPRING STRUCTURE
Filed Jan. 14, 1935
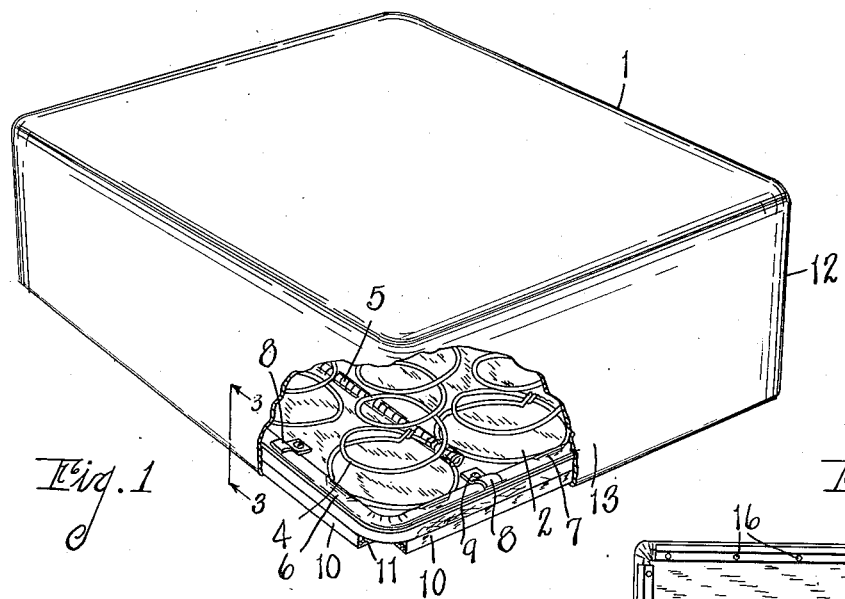
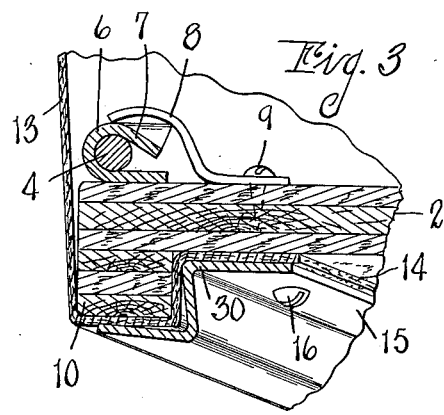
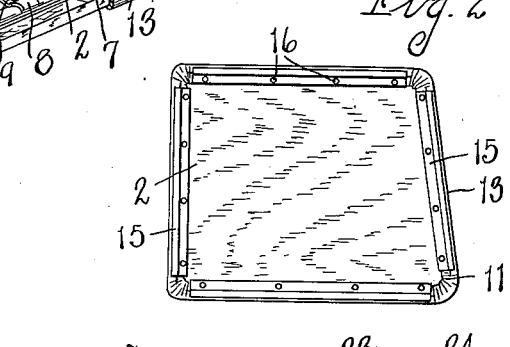
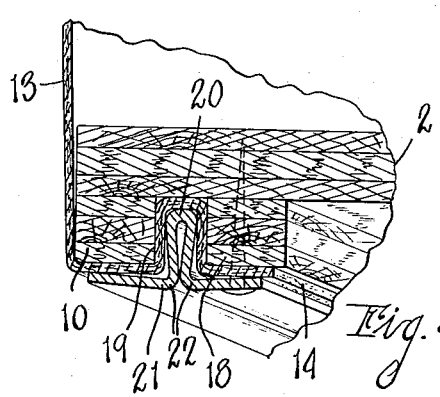
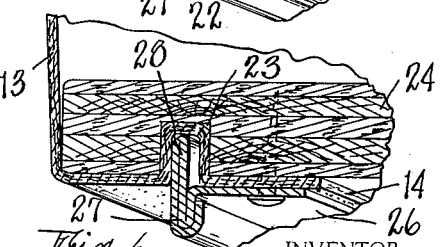
INVENTOR.
William A. Clark
BY
Chappell & Earl
ATTORNEYS Patented Oct. 26, 1937

2,096,786

UNITED STATES PATENT OFFICE 2,096,786

SPRING STRUCTURE

William A. Clark, Detroit, Mich., assignor to L. A. Young Spring and Wire Corporation, Detroit, Mich.

Application January 14, 1935, Serial No. 1,731

7 Claims. (Cl. 155—180)

The main objects of this invention are:

First, to provide an improved spring structure which is well adapted for cushion seats designed for heavy duty service such as that met in certain lines of the automotive vehicle industry—for example, trucks, busses, and the like.

Second, to provide a spring structure of the foregoing character having improved means for securing the upholstery in place and protecting it from injury, which is effective for the purpose and at the same time permits the upholstering by relatively unskilled labor.

Third, to provide an improved spring cushion structure or assembly well adapted for the manufacture of air-bound cushions.

Fourth, to provide a spring cushion structure having these advantages which is simple and economical in its parts, the parts easily assembled, and at the same time very strong and durable.

Objects relating to details and economies of my invention will appear from the description to follow. The invention is defined and pointed out in the claims.

A structure which is a preferred embodiment of my invention is illustrated in the accompanying drawing, in which:

Fig. 1 is a perspective view of a spring cushion embodying the features of my invention, a portion of the upholstery being broken away to better disclose structural details.

Fig. 2 is a bottom plan view of the structure shown in Fig. 1.

Fig. 3 is an enlarged perspective view sectioned on a line corresponding to line 3—3 of Fig. 1.

Fig. 4 is a fragmentary perspective view of a modified form or embodiment of my invention sectioned as is Fig. 3.

Fig. 5 is a fragmentary perspective view of another modification sectioned in a manner corresponding to the section of Figs. 3 and 4.

Fig. 6 is a fragmentary perspective view corresponding to Fig. 5 of a still further modification or embodiment of my improvements.

In the accompanying drawing, 1 designates in general a seat cushion structure suitable for a motor truck. The structure comprises a base panel or bottom plate 2 of suitable shape and dimensions, the panel being made up of a plurality of fiber plies, or is of multi-ply wood veneer. As is characteristic of multi-ply wood veneer, the base possesses relatively great strength and constitutes a closure bottom for the body springs 4 which are superimposed thereon, these body springs being preferably, and in the embodiment illustrated, of the hour-glass type of helically coiled springs.

The body springs are preferably assembled as a unit and are connected in rows by means of the helical tie members 5. This spring unit is provided with a bottom border frame 6 which in the structure illustrated is of inwardly facing channel cross section. It is suitably held upon the base by means of clips 8 engaging the border frame. Portions of the frame are clamped down upon the outer body springs as indicated at 7. The clips are secured by means of the screws 9.

The bottom panel is provided on its under side with a rib-like border member or frame 10, also preferably of multi-ply veneer and of rectangular cross section. This may be glued or nailed to the under side of the base panel as desired. The outer edge of the border frame is flush with the outer edge of the base panel. The border member is preferably of rectangular cross section for the purpose of securing more effective snubbing and binding action on the upholstery skirt than would otherwise result.

In the embodiment shown in Figs. 2 and 3, the border members are separately formed and secured to the under side of the relatively thin veneer panel and they are spaced at the ends to permit the folding and crimping of the corner portions of the upholstery skirt. The upholstery 12 is disposed on the body springs and includes a skirt 13 and the bottom edge 14 of the skirt is folded inwardly around the border members and lapped upon the bottom of the base panel as clearly shown in Fig. 5. The skirt is secured in this position by means of the clamping strips 15 preferably formed of strips of sheet metal bent into a Z-cross section, the inner arms of these strips being disposed upon the portions of the skirt lapping the bottom of the base panel and secured and clamped thereon by means of the screws 16.

The outer frames or arms of these clamping strips are in lapping clamping engagement with the portions of the skirt disposed across the under side of the border members and the clamping strips are preferably so shaped that when the screws are driven home, these outer arms engage with a spring clamping action. Thereby upholstery or upholstery skirts of very substantial material or thickness may be effectively clamped or secured in place. The inner angles or portions 30 of these clamping strips coact with the inner edges of the base panel border members in clamping the upholstery and further, the upholstery is engaged with these securing parts with a snubbing action at at least three points, namely, around the angle 30 and over the edges of the border members, so that with the clamping actions described, the upholstery is effectively secured with a minimum of strain thereon.

In the embodiment illustrated, the clamping strips are of a length substantially equal to the side dimensions of the structure, as shown in Fig. 2, but they may be made of sections, if desired, or continuous. However, we prefer to make them as illustrated of a length corresponding to the dimensions of the cushion, as shown in Fig. 2, which enables very rapid assembly, and the upholstery, at the corners, may be tucked or folded into the spaces 11, so that it is possible to provide a very smooth corner with a minimum of effort on the part of the upholsterer. By using suitable upholstery, substantially air-bound cushions may be easily provided, and if an air-bound cushion is not desired, or if only a partially air-bound structure is desired, a suitable hole or holes may be provided in the base panel.

In this embodiment, the binding strips provide suitable wear plates, effectively protecting the upholstery. The structure is especially desirable for automobile trucks, busses and the like, where such structures are subjected to very severe usage and at the same time it is relatively light in weight and economical to produce.

In the embodiment shown in Fig. 4, an inner border or upholstery clamping member 18 corresponding to the border member 10 is provided, this being mounted in spaced relation to the border members, providing a bottom groove 19 for receiving portions of the inturned edge 14 of the upholstery, the latter being held therein by a spring clamping action resulting from the looped spring tongue 20 of the clamping strip 21. The angles 22 of the strip are preferably more acute than the corresponding angles of the border frame and the inner clamping members to provide a certain amount of spring clamping action on the upholster skirt, increasing the effectiveness of the clamping strips and holding the upholstery in place, and also accommodating varying thicknesses and characteristics of the upholstery material.

In the embodiment of my invention shown in Figs. 5 and 6, the base panel 24 is made up of a sufficient number of plies, or is of sufficient thickness so that the groove or channel 23 may be formed on the under side thereof in spaced relation to the edge, so that the border members 10 are, in effect, formed integrally with the base panel. The same type of clamping strip 21 is here employed as described in connection with Fig. 4.

In both of these embodiments, the clamping strip constitutes wear plates or members, protecting the upholstery and receiving the bottom cushion wear.

In the embodiment shown in Fig. 6, the bottom strip or frame 26 is conformed to provide a downwardly projecting supporting rib-like member 27 in addition to providing the outer projecting spring clamping tongue 28 engaged within the channel. In this embodiment, the sheet metal strip 26 is folded upon itself to provide the desired rigidity and permit the use of relatively light sheet metal.

In all of these embodiments, the upholstery is very effectively secured and the upholstering may be performed by relatively unskilled workmen.

Notwithstanding the comparatively low cost of my improvements, I provide a spring structure which is very effective and efficient and which is well adapted for heavy duty service in connection with cushioned seats for trucks and the like. Further, my spring structure is formed as a unit and is sufficiently rugged by virtue of its construction to withstand hard knocks and severe usage even when misplaced and subjected to twisting forces other than those usually associated with seat cushions.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Although I have shown and described certain specific embodiments of my invention, I am fully aware that many modifications thereof are possible. My invention is therefore not to be restricted except insofar as is necessitated by the prior art and by the spirit of the appended claims.

Having thus described my invention, what I claim as new and desire to secure by Letters Patent, is:

1. In a spring structure, the combination of a body spring unit, a multi-ply fiber base panel of a size and shape to receive the spring unit which is superimposed thereon, said panel having rib-like multi-ply border upholstery securing members on the under side thereof, said border members being of rectangular cross section, upholstery for said body springs comprising a skirt folded around said border members and lapped upon the bottom of said base panel, the ends of said border members being spaced at the corners of the panel to permit the folding of portions of the upholstery skirt therebetween, and angled clamping strips disposed on the under side of said base panel in overlapping relation to the infolded edges of the skirt and clamping the upholstery on the under side and inner edge of said border members.

2. In a spring structure, the combination of a body spring unit, a multi-ply fiber base panel of a size and shape to receive the spring unit which is superimposed thereon, said panel having rib-like multi-ply border upholstery securing members on the under side thereof, upholstery for said body springs comprising a skirt folded around said border members and lapped upon the bottom of said base panel, acutely angled clamping strips of Z cross section disposed on the under side of said base panel in overlapping relation to the infolded edges of the skirt and clamping the upholstery on the under side and inner edge of said border members with a spring clamping action, the outer arm of said strips of Z section overlying said border members, and means securing the inner arm to the panel.

3. In a spring structure, the combination of a base panel having border members on its under side spaced at the corners of the base panel to permit folding of portions of the edge of an upholstery skirt therebetween, body springs mounted on said base panel, upholstery for said springs comprising a skirt having its edges folded around the under side of said border members and lapping the under side of the base panel, and clamping strips disposed in overlapping relation to the inturned edge of said upholstery skirt and binding it against the inner side of said border members.

4. In a spring structure, the combination of a body spring unit, a base panel of a size and shape to receive the spring unit which is superimposed thereon, said panel having rib-like border members, upholstery for said body springs comprising a skirt folded around said border members and lapped upon the bottom of said base panel, the ends of said border members being spaced at the corners of the panel to permit the folding of portions of the upholstery skirt therebetween, acutely angled clamping strips of Z-cross section disposed on the under side of said base panel in overlapping relation to the said folded edges of the skirt and clamping the upholstery on the under side and inner edge of said border members with a spring clamping action, the outer arm of said strips of Z section overlying said border members, and means securing the inner arm to the panel.

5. In a spring structure, a base panel, a spring unit mounted on said panel, border members on the under side of said base panel providing a groove spaced from the sides of said panel, upholstery comprising a skirt having its edges lapped around said border members, the ends of said border members being spaced at the corners of said panel to permit the folding of portions of the upholstery skirt therebetween, and clamping strips for holding the skirt in snubbing engagement with said border members, said strips having a tongue extending into the groove, and inner and outer arms disposed at acute angles to said tongue, said arms exerting spring clamping action on the upholstery.

6. In a spring structure, the combination of a base panel having border members on its under side, body springs mounted on said base panel, upholstery for said springs comprising a skirt having its edge folded around the under and inner side of said border members, clamping strips of angled section wedging said skirt against said border members, said strips comprising an arm disposed under the border members and a portion disposed at the inner side of the border members and joined to the arm at an acute angle, said portion clamping the skirt against the border members at a point adjacent the meeting point of the border members and base panel, the arm clamping the skirt against the border members at a point adjacent the free end of the arm, and a further portion of the strip between the two clamping points being spaced from the skirt whereby a spring clamping action is imparted at those points, and means operatively securing the clamping strip to the base panel.

7. In a spring structure, the combination of a body spring unit, a base panel supporting said unit, said panel having border members thereon, upholstery for said body spring unit comprising a skirt folded around said border members, acutely angled clamping strips of Z cross section disposed on the under side of said base panel clamping the upholstery on the under and inner edge of said border members with a spring clamping action, the outer arm of said strips of Z section overlying said border members, and means securing the inner arm to the panel.

WILLIAM A. CLARK.